B. VAN WHY.
GRASS CATCHER.
APPLICATION FILED APR. 18, 1917.
1,236,507.
Patented Aug. 14, 1917.
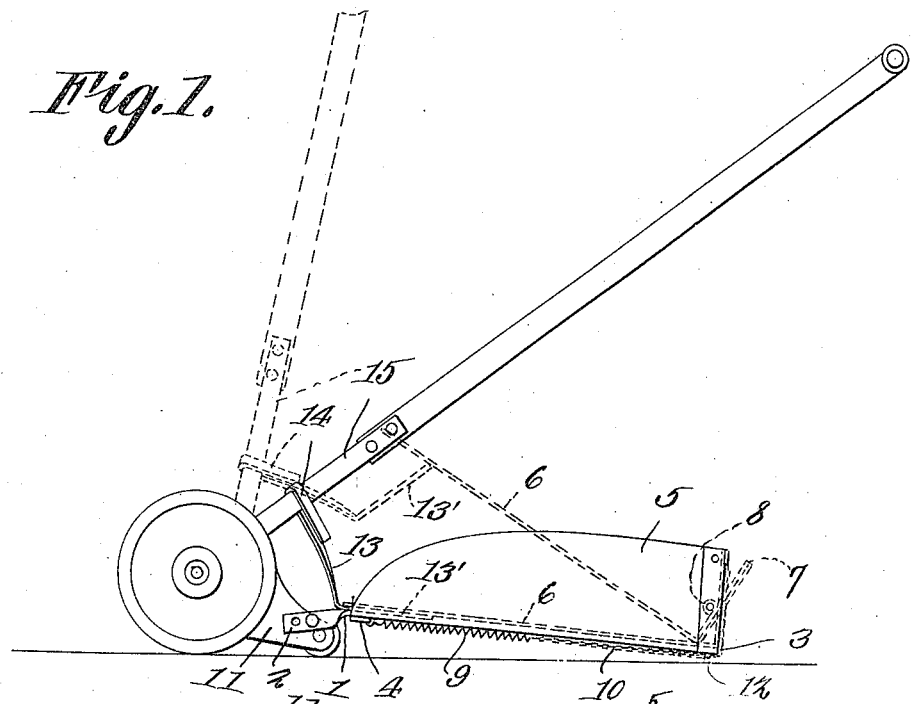
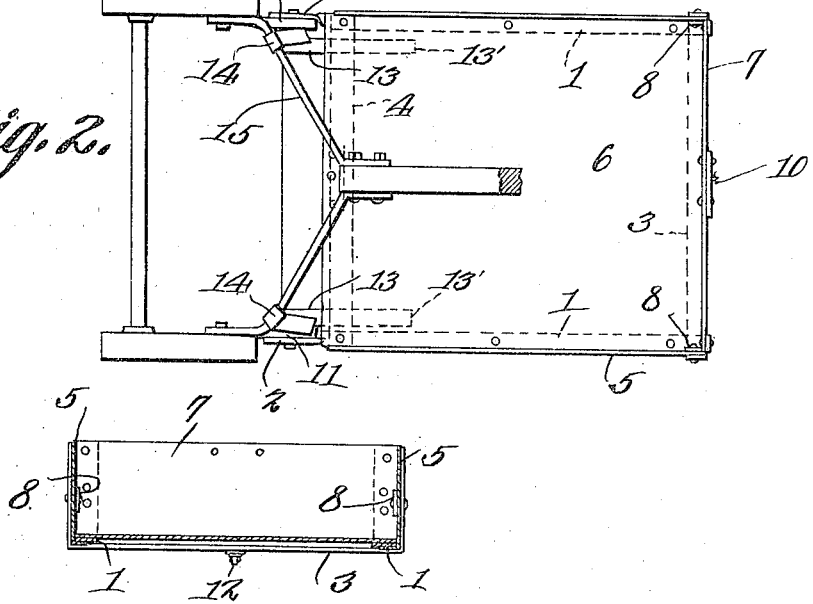
Witness
Inventor
Benjamin Van Why
By C. A. Snow & Co.
Attorneys

UNITED STATES PATENT OFFICE.

BENJAMIN VAN WHY, OF NEW CASTLE, PENNSYLVANIA.

GRASS-CATCHER.

1,236,507. Specification of Letters Patent. Patented Aug. 14, 1917.

Application filed April 18, 1917. Serial No. 162,937.

*To all whom it may concern:*

Be it known that I, BENJAMIN VAN WHY, a citizen of the United States, residing at New Castle, in the county of Lawrence and State of Pennsylvania, have invented a new and useful Grass-Catcher, of which the following is a specification.

The subject of this invention is a grass catcher of the class intended for attachment to a lawn mower.

The main object of the invention is to provide a grass catcher with means for automatically dumping grass therefrom.

Another object is to provide a grass catcher which will be partially dumped by movement of the handle of the lawn mower to which it is attached, the completion of the dumping operation being automatically performed.

Another object is to provide a grass catcher which may be easily attached to a lawn mower, in position to receive the cut grass from the mower.

Still another object is to provide a simple, light and efficient grass catcher.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

A practical embodiment of the invention is shown in the accompanying drawing, wherein:—

Figure 1 is a side elevation showing the grass catcher attached to a lawn mower, the dumping operation indicated as partially completed in dotted lines.

Fig. 2 is a plan view of the device, with the mower handle broken away.

Fig. 3 is a central vertical cross section.

Referring to the drawing by numerals:—

Side bars 1—1, each provided with a quarter-turned end 2, which is disposed at a slight angle to the main portion of the bar, are connected at one end by a rear cross bar 3, and adjacent the quarter-turned end 2, by a cross bar 4. A side 5 rises from each side bar 1, to which it is secured by riveting or in any other suitable and convenient manner. The rear bar 3, preferably, has each end extended beyond the side bar 1 and bent upwardly to engage the outer surface of the sides 5, to which they are riveted or otherwise secured, and for which they form a support.

A bottom 6 rests on the side bars 1, and is formed with an upturned rear end 7 which is provided with ears 8 through which the bottom is pivotally connected to the rear ends of the sides 5. As will be seen most clearly in Figs. 1 and 3, the ears 8 are spaced from the bottom 6 a distance somewhat less than half the height of the upturned end 7.

A coiled spring 9, which underlies the bottom 6 and extends longitudinally thereof, has one end secured to the front cross bar 4 and its other end attached to the end of a chain or flexible connector 10, which extends beneath and longitudinally of the bottom, and is brought up to fasten to the outer surface of, and near the upper edge of the upturned end 7.

The device is secured to a lawn mower by bolting the ends 2 to the rearwardly extending arms 11, which are provided on all mowers. For ease of traction, a caster 12 may be mounted below the rear cross bar 3.

Angled rods 13 are provided, each of which has one end bent to form a hook 14 which is adapted to be hooked over a connecting strap, or Y-arm 15 of the mower handle. The other end 13' of each bar 13 normally lies between the cross bar 4 and the bottom 6 and extends for a short distance, longitudinally of the bottom.

The invention is used in the following manner:—The device is secured to a lawn mower, as hereinbefore described, and the mower operated in the usual manner. The cut grass, thrown up by the mower knives, falls into the catcher and gravitates toward the rear because of the inclination given the catcher by the angled ends 2. When sufficient grass has been collected, the mower handle is thrown forward, causing the bent rods to be moved from their normal position and lift, through their ends 13', the forward end of the bottom 6. Lifting the forward end of bottom 6 will cause the grass to gravitate to the end 7 and, since the pivot point of the bottom is situated nearer the lower than the upper edge of rear portion 7, the weight of the grass, on the rear portion 7, will tend to overbalance the parts and cause the bottom to dump. This action is supplemental to that of the coiled spring 9 which through chain 10 exerts a pull on the rear portion 7 as soon as it is thrown from the vertical.

Having described my invention, what I claim as new and desire to secure by Letters Patent, is:—

1. A grass catcher, comprising a receptacle, means for securing the receptacle to a lawn mower, a bottom pivotally secured in the receptacle, means for partially rotating the bottom by movement of the mower handle in one direction, and resilient means operating on the partially rotated bottom to further rotate the bottom and dump the contents of the receptacle.

2. A grass catcher, comprising a receptacle, means for securing the receptacle to a lawn mower, a bottom pivotally secured in the receptacle, means secured to the mower handle and underlying the bottom to partially rotate the bottom, and resilient means operating on the partially rotated bottom to further rotate the bottom and dump the contents of the receptacle.

3. A grass catcher, comprising a receptacle, means for attaching the receptacle to a lawn mower, a bottom pivoted in the receptacle, arms secured to the mower and underlying the bottom, operable to partially rotate the bottom upon its pivot, and means operating on the partially rotated bottom, to further rotate the bottom to dump the contents of the receptacle.

In testimony that I claim the foregoing as my own, I have hereto affixed my signature in the presence of two witnesses.

BENJAMIN VAN WHY.

Witnesses:
CHAS. A. McCREADY,
Mrs. BENJAMIN VAN WHY.

Copies of this patent may be obtained for five cents each, by addressing the "Commissioner of Patents, Washington, D. C."